United States Patent
Witkowski et al.

(10) Patent No.: US 6,457,000 B1
(45) Date of Patent: Sep. 24, 2002

(54) METHOD AND APPARATUS FOR ACCESSING PREVIOUS ROWS OF DATA IN A TABLE

(75) Inventors: Andrew Witkowski, Foster City; Bhaskar Ghosh, Burlingame, both of CA (US)

(73) Assignee: Oracle Corp., Redwood Shores, CA (US)

( * ) Notice: Subject to any disclaimer, the term of this patent is extended or adjusted under 35 U.S.C. 154(b) by 0 days.

(21) Appl. No.: 09/363,996

(22) Filed: Jul. 29, 1999

(51) Int. Cl.$^7$ .............................................. G06F 17/30
(52) U.S. Cl. ......................... 707/2; 707/100; 707/102; 707/200
(58) Field of Search .................... 707/1–4, 100, 707/200–204, 101, 102

(56) References Cited

U.S. PATENT DOCUMENTS 5,724,570 A * 3/1998 Zeller et al. ................ 395/603
5,822,751 A * 10/1998 Gray et al. ...................... 707/3
6,205,451 B1 * 3/2001 Norcott et al. .............. 707/204

OTHER PUBLICATIONS

Zemke et al. (Introduction to OLAP functions, http://www.cse.iitb.ernet.in:8000/proxy/db/~dbms/Data/Papers-Other/SQL1999/OLAP-99-154r2.pdf, May 5, 1999).*
Wilson (Getting Started with Oracle SQL Analyze, Oracle, Release 1.6.0, Jun. 1998).*
Parallel Query Tuning (release 7.3.3 http://drift.ux.his.no/doc/oracle/DOC/server/doc/A48506/pqo.htm, 1997).*

* cited by examiner

*Primary Examiner*—Hosain T. Alam
*Assistant Examiner*—Joon Hwan Hwang
(74) *Attorney, Agent, or Firm*—Ditthavong & Carlson, P.C.

(57) ABSTRACT

A method and apparatus is disclosed for allowing access to one or more previously generated rows of data. A server receives a statement that requires delivery of one or more rows of data to a client, and designates a particular row of data as a current row within a generation sequence. As the rows of data are being delivered to the client, the server accesses select previously generated rows of data that has already been delivered to the client without designating a new particular row of data as the current row. Once the previously generated row is accessed, data is retrieved from predetermined columns. The data retrieved may be used to perform various calculations that will insert values into the current row prior to delivery of the current row to the client. The statement transmitted by the client may include various parameters, including a default parameter, that specifies a default value to be used by the server. The previously generated row is then retrieved based on an offset parameter specified by the client. If the location determined is outside a predetermined range of addressable rows in the generation sequence, then the default value specified by the default parameter is returned. The present invention may also be configured to use a buffer and manage dynamic memory allocated to the buffer.

27 Claims, 5 Drawing Sheets

| day | sales | c_sum |
|-----|-------|-------|
| 1 | $ 500 | $ 500 |
| 2 | $ 560 | $ 1,060 |
| 3 | $ 700 | $ 1,760 |
| 4 | $ 750 | $ 2,510 |
| 5 | $ 675 | $ 3,185 |
| 6 | $ 600 | $ 3,785 |
| 7 | $ 625 | $ 4,410 |
| 8 | $ 635 | $ 5,045 |

METHOD AND APPARATUS FOR ACCESSING PREVIOUS ROWS OF DATA IN A TABLE

FIELD OF THE INVENTION

The present invention relates to database operations and more particularly to an apparatus and method for providing access to prior rows of data stored in a table.

BACKGROUND OF THE INVENTION

Database systems typically allow users to store, update, and retrieve information by submitting commands to a database server. To be correctly processed, the commands must comply with the database language that is supported by the database server. One popular database language is known as the Structured Query Language (SQL). SQL provides a user with the ability to create tables that can be used to store various types of information. The tables are generally organized in the form of rows and columns. SQL also provides a user with the ability to generate complex queries that can be used to retrieve specific information from the tables. The information retrieved may be further organized into meaningful form for subsequent presentation and/or analysis.

Queries are often created by users through a client station and then submitted to a database server. The database server processes each query and generates a query result that satisfies the criteria defined by the query. The query result is then transferred back to the client station from which the query originated.

One type of query that is often generated by a user involves the calculation of reporting functions that generate values for a current row based on values in previous rows. Reporting functions include cumulative sums, moving sums, moving averages, etc. In order to efficiently compute the required values, reporting functions require simultaneous access to multiple rows of a table. However, the standard SQL implementation does not provide an efficient method for accessing more than one row of a table at a time.

Consider a table having stored therein "sales data" that records the sales of a company. The sales data is entered for each day in a different row of the table. Assume that a user desires to know the cumulative sum to date for every day (or a predetermined number of days) in the table. One way to calculate the cumulative sum for a particular day is to add the sales data of that particular day to the cumulative sum that was calculated for the previous day.

Unfortunately, SQL does not provide an efficient mechanism to perform this type of operation, since it requires access to a value calculated for a prior row. Rather, SQL only allows access to columns in the current row. Therefore, it is difficult to efficiently perform functions such as cumulative sums, moving averages, etc.

A typical approach for overcoming the problem of accessing data stored in previous rows of a table is to perform a self-join of the table. For example, consider a table T having R rows. If an operation or computation requires simultaneous access to values stored in previous adjacent rows, such as rows one through four (1–4), then four self-join operations must be performed before the user is able to execute the query that will result in, for example, a cumulative sum. This approach becomes increasingly inefficient as the size of the table increases, because the join operations become increasingly time consuming. Additional inefficiencies arise based on the number of desired rows that must be accessed at one time. In other words, an operation that uses data from n adjacent rows requires n copies of the table and n−1 self-join operations.

Another approach for overcoming the aforementioned deficiency is to program the required logic for accessing multiple rows at the application level. However, this approach may not be efficient, as it requires bringing rows from the database to the application. Also, this approach does not provide language primitives to operate on previous rows and thus decreases the generality of SQL-based solutions.

Based on the foregoing, a primary disadvantage associated with current methods of executing queries that must operate on series of ordered rows such as, for example, reporting functions is the number of operations that must be performed on the table before the reporting function can be computed.

SUMMARY OF THE INVENTION

Accordingly, there is a need for methods and apparatus for reducing the number of join operations necessary in order to calculate values derived from multiple rows of a table.

These and other needs are addressed by the present invention, wherein a database server accesses one or more previous rows of data (relative to a current row of data). When calculating a desired time series representation, the techniques described herein eliminate the need to perform multiple self-joins.

In accordance with one aspect of the present invention, a server receives a statement that requires generation of one or more rows of data. The server delivers the one or more rows of data to the client station in a particular generation sequence. The row currently being generated is designated to be the "current row of data". Rows that precede the current row of data in the generation sequence are "prior" or "previous" rows relative to the current row. As the current row of data is being generated, the server accesses a previously generated row of data. Thus, a current row can contain a function of previous rows and the current row itself.

According to one embodiment of the present invention, the server stores each previously generated row into a buffer. When access to a previously generated row is required, the server finds the row in that buffer.

In accordance with another aspect of the present invention, the statement may include various parameters that specify particular information regarding the previously generated row. One such parameter is an offset parameter that specifies a location, in the generation sequence, of the previously generated row relative to the current row. According to a specific embodiment of the invention, the statement also includes a default parameter that specifies a default value which will be returned if the offset parameter is determined to be outside a predetermined range of addressable rows in the generation sequence. The statement will also include a column parameter that specifies the column from which values will be retrieved. Another aspect of the invention is the ordering of the generation sequence.

According to another aspect of the present invention, a computer readable medium is specifically configured to carry one or more sequences of instructions for performing the techniques described herein. In addition, a system is provided for implementing the techniques.

The present invention advantageously provides an ability to simultaneously access multiple rows of data from one table. This ability eliminates the number of operations, such as self-joins, that are required in order to create a table that includes current column values derived from rows that have been previously processed. This is achieved by utilizing the offset included in the received statement to indicate where the previous row is located, without changing the value or designation of the current row. The present invention may also be configured to efficiently manage dynamic memory in the server by removing unnecessary rows from the buffer contained in dynamic memory, or storing only those rows that are needed.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for retrieving previous rows of data is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Hardware Overview

Figure 1:
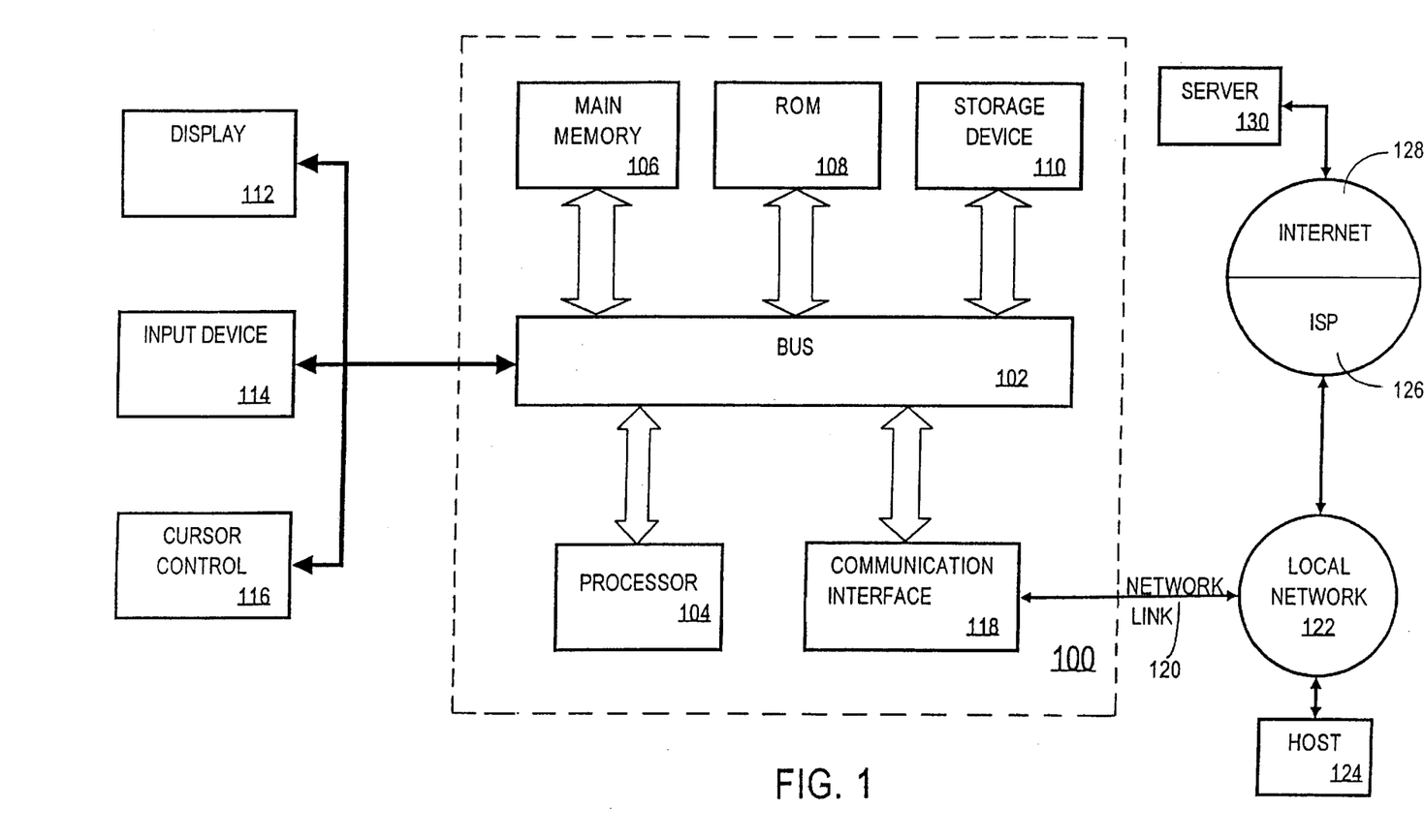
FIG. 1 is a block diagram illustrating a computer system that may be used to implement the present invention.

FIG. 1 is a block diagram that illustrates a computer system 100 upon which an embodiment of the invention may be implemented. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of computer system 100 for providing access to previous rows of data. According to one embodiment of the invention, the previous rows of data are accessed by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. In alternative embodiments, hardwired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as main memory 106. Transmission media includes coaxial cables, copper wire and fiber optics, including the wires that comprise bus 102. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be carried on a magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector can receive the data carried in the infra-red signal and appropriate circuitry can place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication network now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120 and communication interface 118. In the Internet example, a server 130 might receive a query request from a user and transmit a query result through Internet 128, ISP 126, local network 122 and communication interface 118. In accordance with the invention, information such as cumulative sums, moving averages, etc. may be efficiently transmitted because information from previous rows of data is accessible as values for the current row of data is being fetched and calculated, as described herein.

Functional Overview

The present invention allows a server to execute a function that provides access to previous rows of data. According to an embodiment of the present invention, the function is referenced using the keyword PRIOR. A database server that supports SQL may access the PRIOR function within standard SQL statements.

The PRIOR function may be represented, for example, as a statement in the form of:

PRIOR (column, offset, default value)

As shown in the exemplary statement, the PRIOR function may include several optional parameters. Alternatively, the PRIOR function can be used without any of the parameters listed. The "offset" parameter is used to specify an offset, relative to the current row, of the previous row from which data is to be retrieved. For example, a value of 0 indicates that the previous row is sequentially located zero rows prior to the current row. Consequently, a value of zero refers to the current row. A value of 1 indicates that the previous row is sequentially located 1 row prior to the current row, a value of 2 indicates that the previous row is sequentially located two rows prior to the current row, etc.

The "default value" parameter is used to indicate a value that will be returned if the offset parameter would cause us to access rows outside the available range. For example, if the current row is the fifth row in the generation sequence of rows and the offset parameter has a value of 6, then the previous row specified by the offset parameter is undefined because it falls outside of the addressable range of rows. In such instances, the default value is returned.

The "column" parameter is used to identify a specific column (or expression on columns) within the previous row from which data will be retrieved. For example, if a row of data contains columns that are named:

[convertible_sales, van_sales, truck_sales], then a value of"van_sales" for the column parameter would indicate to the server that data must be retrieved from the second column in the row.

For example, a statement such as:

PRIOR (sales, 5, 0) would indicate to the server that the value in the sales column in the row five rows before the current row should be retrieved and added together.

According to one embodiment of the present invention, all of the parameters in the statement except for the column parameter are optional. For example, a user could merely present a statement in the form of:

PRIOR (sales) The server would then be configured to interpret such a statement a particular way. For example, the previous row retrieved would always be the row that immediately precedes the current row. Furthermore, the default value would always be interpreted as 0.

Also note that the PRIOR function can be applied only on ordered data. The ordering can be defined in one of two ways. It can come from the order-by clause of the query block in which the PRIOR function is used, or it can be specified as an additional parameter inside the PRIOR function itself. In order to keep the discussion simple, we have used only the first alternative in this document.

Buffer Management

According to one embodiment of the invention, implementation of the PRIOR function uses a buffer memory area. The buffer may be created in various ways depending on the specific implementation of the PRIOR function and the location of the previous row relative to the current row.

According to one embodiment of the invention, a sliding window is defined based on the offset parameter. The sliding window may alternatively be defined based on predetermined conditions. When a single buffer is used, the size of the sliding window dictates the minimum size of the buffer. For example, if the offset is 5, then the sliding window is 6 (to hold the current row and the five prior rows). Consequently, the buffer allocated to support the sliding window is large enough to hold the desired data from six rows.

Various benefits are gained by the use of a single buffer that is large enough to simultaneously hold the desired data from the current row, the prior row associated with the highest offset, and all rows in between. In such an implementation, one fetch is required to retrieve each new current row, but additional fetches are not required to retrieve data from the desired prior rows. The additional fetches are unnecessary because the desired prior rows are still in the buffer from when they were fetched as the current row.

According to another embodiment, multiple in-memory buffers are created to store previous rows. This particular embodiment is especially useful in situations where the query includes multiple PRIOR functions, or when the offset is particularly large.

Consider an example of a query that includes two PRIOR functions. If the offset parameters used in the different PRIOR functions require access to rows that are far apart from each other, then a first buffer is created to accommodate the first offset parameter and a second buffer is created to accommodate the second offset parameter. Separate pointers are then used to reference the two buffers. Note that according to the first embodiment, we could have used a single buffer in this case where the buffer length would be the maximum of the two offsets appearing in the two PRIOR functions.

As discussed above, the buffers are created in memory and pointers are used to provide access to the previous rows. Various types and combinations of memory may be used to implement the buffers, including non-volatile memory such as magnetic disks and volatile memory such as RAM. Accordingly, the pointers could be used to identify the location, on either the non-volatile or volatile memory, where the rows are stored.

Using the Prior Function

As previously stated, the PRIOR function may be used in conjunction with various SQL statements while processing queries. The PRIOR function is particularly useful in creating reporting functions. A reporting function can be simply defined as a function that calculates a current value based on at least one previous value. Examples of reporting functions are as follows: time series calculations, cumulative sums, moving sums, moving averages, ranks, etc.

Figure 2:
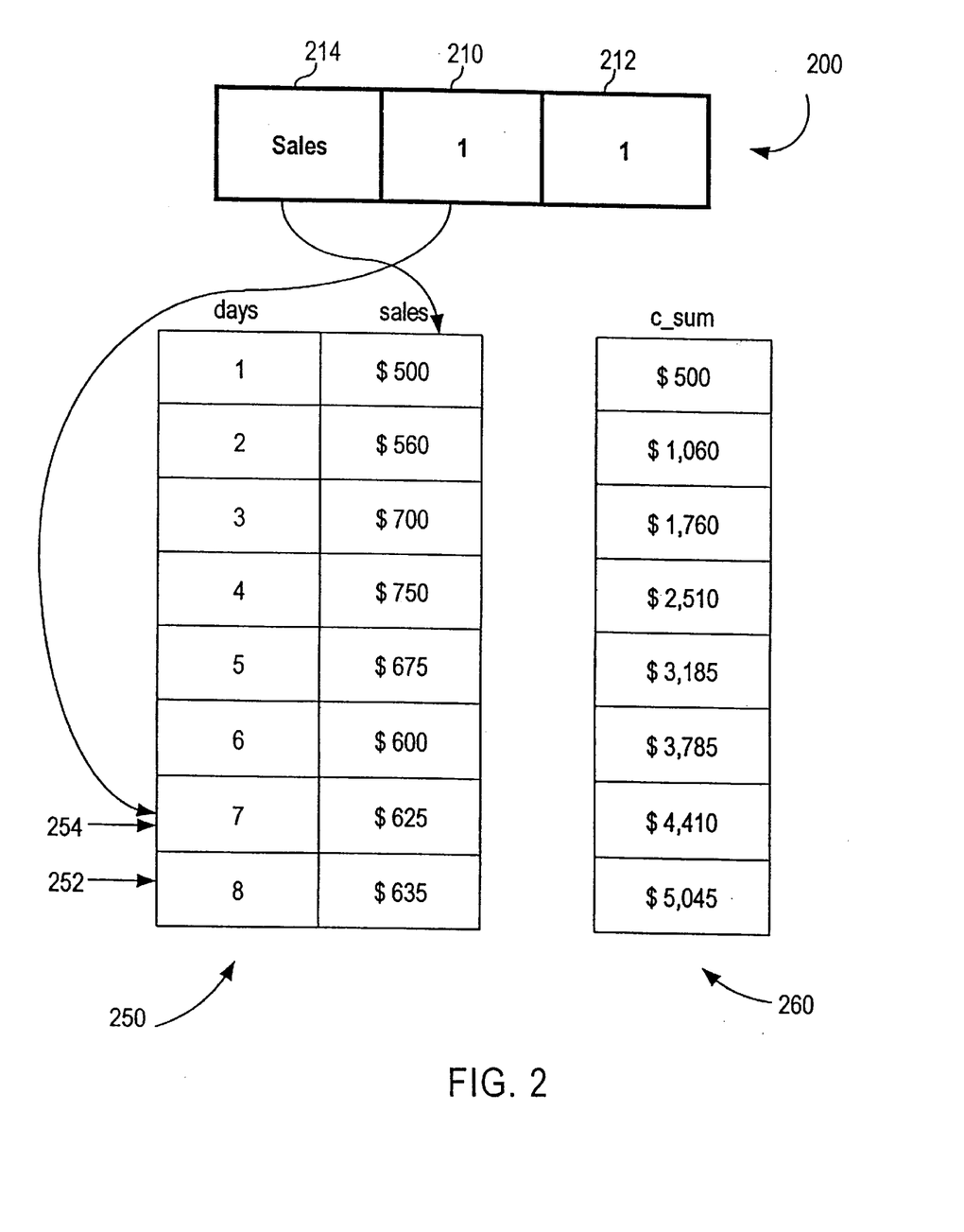
FIG. 2 is a block diagram illustrating an exemplary parameter block in a PRIOR function and the relationship to a table.

FIG. 2 is a block diagram illustrating an exemplary parameter block 200 corresponding to parameters that may be contained in a PRIOR function, and the relationship of those parameters to a table 250 that contains the values with which calculations will be performed. The parameter block 200 illustrated in FIG. 2 includes three blocks that contain values corresponding to parameters that would typically be included in a PRIOR function. The parameters block 200 corresponds to an actual usage of the PRIOR function in the form of:

PRIOR (sales, 1, 1).

According to the embodiment exemplified by FIG. 2, the parameter block 200 includes three parameters, namely a target column 214, an offset parameter 210, and a default value 212. The offset parameter 210 stores a value indicative of the sequential location of the desired previous row of data relative to the current row of data.

The table 250 illustrated in FIG. 2 contains two columns, namely day and sales. Such a table 250 can be representative, for example, of the sales data of an outlet store. The day column stores values based on particular days within a given month, for example. The sales column indicates the receipts collected for that particular day. The first row of the table 250 contains the values from the first day of the week where data collection began.

In the present example, the row containing data for the eighth day (row 252) is the current row in the generation sequence. Accordingly, the current row pointer points to row 252. The offset parameter 210 of the statement block 200 specifies an offset of one, thus making row 254 the prior row of interest because it is one row prior to the current row 252.

If the value of the offset parameter 210 were greater than seven, then the prior row of interest would be undefined according to the table 250 illustrated in FIG. 2. Hence, the default value 212 would be used. As indicated in the exemplified embodiment, the default value is one. Therefore, the server 130 would automatically return a value of one.

FIG. 2 also includes a second table 260 that illustrates the results generated for a query that accesses the first table 250 and makes use of the PRIOR function. The table 260 includes a single column entitled c_sum (cumulative sum). The c_sum column of the second table indicates the sum of the sales receipts from the first day to the current day. Values for the c_sum column can be calculated using a statement such as:

PRIOR (c_sum, 1, 0)+sales.

The SQL statement listed above informs the server to access the row in the generation sequence that immediately precedes the current row and retrieve the value in the c_sum column of that prior row. The retrieved value for c_sum is then added to the value of the sales column for the current row. The second table 260 itself can be calculated using a standard SQL statement that creates tables, such as:

SELECT (PRIOR (c_sum, 1, 0)+sales) as c_sum
FROM table_1
ORDER BY day where table_1 is the name of the first table.

According to the present invention, the PRIOR function can be used to create derived columns in SQL. For example, a table containing three columns and a particular sort order can be created using the following statement:

SELECT day, sales, (PRIOR (c_sum, 1, 0)+sales) as c_sum
FROM table_1
ORDER BY day.

Figure 3:
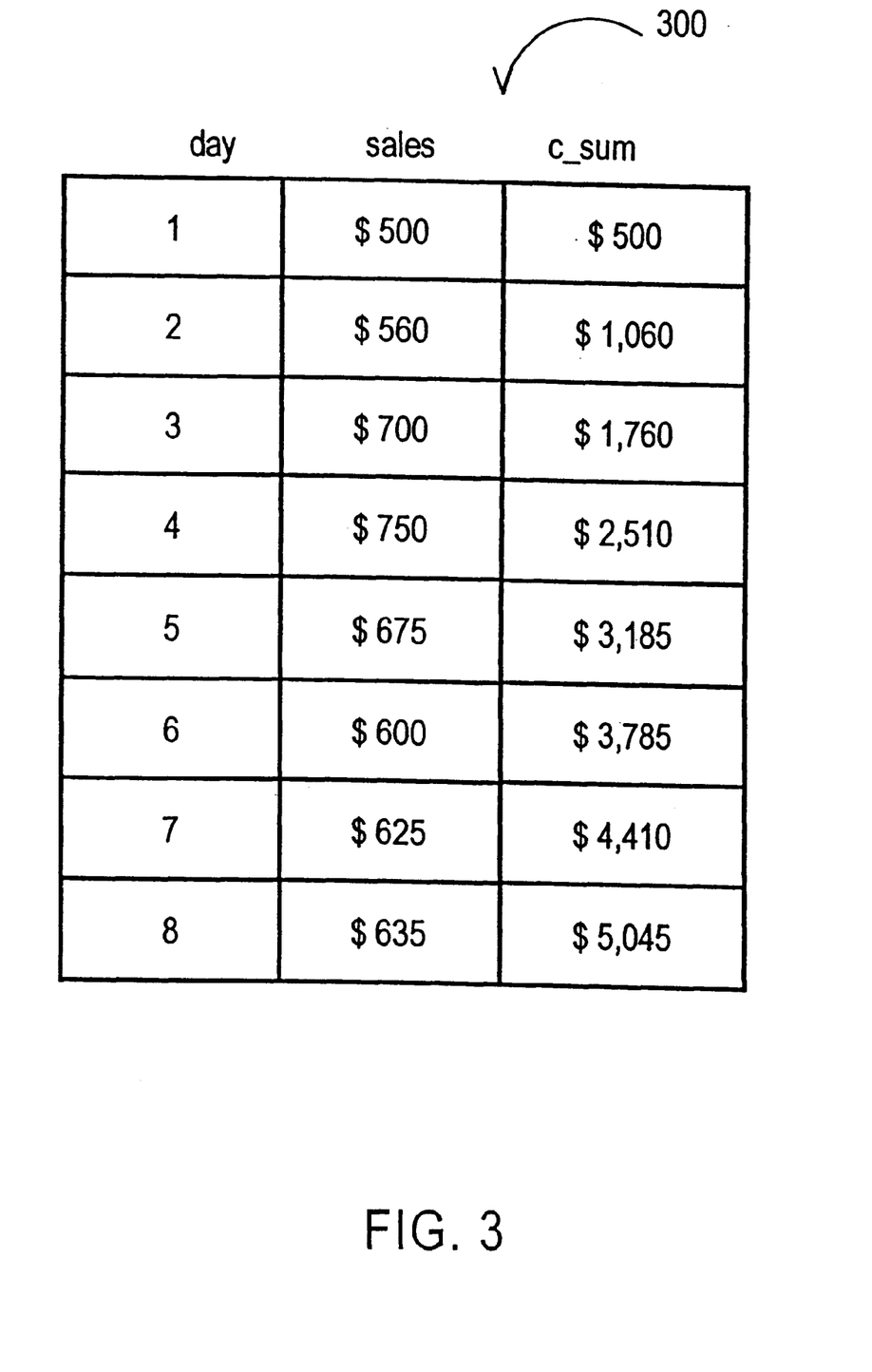
FIG. 3 is an exemplary table created using an SQL statement that includes the PRIOR function.

FIG. 3 illustrates a third table 300 that would be created based on the above SQL statement. According to such a statement, the third table 300 would contain three columns. The first column (day) would store values corresponding to the day number (e.g., first day, second day, third day, etc.), the second column (sales) would store values corresponding to the total receipts for the corresponding day, and the third column would store values corresponding to the cumulative sum over the selected days. In addition, the table would be ordered, in ascending order, based on the day so that the values in the c_sum column can be meaningfully interpreted.

Another reporting function that can be easily calculated by the PRIOR function is a moving average. A moving average in an average value calculated over a predetermined range that is less than the total number of rows. Each subsequent calculation includes a new row and excludes the oldest row previously used in the calculation. For example, a moving average can be easily calculated using the PRIOR function and a sliding window, where the sliding window represents the number of days to be included in each average. Using a value of 3 for the sliding window, a third table containing a moving average over three day periods can be created using the statement:

SELECT day, sales,
(PRIOR (c_sum 1, 0)+sales) as c_sum,
(c_sum−PRIOR (c_sum, 3, 0))/3 as m_avg
FROM table_1
ORDER BY day As illustrated in the above example, the PRIOR function can also be used in conjunction with any mathematical function normally available for use with SQL statements. A moving sum over a three day period could easily be calculated by eliminating the division operation in the above statement, resulting in the following:

SELECT day, sales,
(PRIOR (c_sum, 1, 0)+sales) as c_sum,
(c_sum−PRIOR (c_sum, 3,0)) as m_sum
FROM table_1
ORDER BY day.

The m_sum column would correspond to a moving sum for the total receipts from the past three days. The m_sum column can easily be configured to calculate the sum of all receipts for a week, for each week of the month, for each month of the year, etc. Once calculated, the data can be manipulated for further analysis. This is accomplished by simply changing the offset parameter in the PRIOR function to correspond with the desired number of days to be included in the moving sum calculation.

The size of the sliding window is definable using other parameters and counting variables in order to ensure that once the predetermined number of days have passed, a new moving sum calculation is initiated. For example, the value of the moving sum column for the first day of a given week is simply the value of the sales column of the row corresponding to the first day of the week. The values of the moving sum column for days 2–7 of any given week is calculated by adding the value of the sales column in the current row to the value of the moving sum column from the previous row. Once the value of the moving sum has been calculated for the current row, it is stored in the m_sum column of the current row. After the m_sum value has been stored, the current row 252 may be transmitted to the client station 124, and the next row in the generation sequence may be established as the current row.

The PRIOR function described herein provides convenient and flexible access to previous rows of data, thereby simplifying calculations that involve time-series representation of numbers. The PRIOR function may include all the parameters necessary to properly identify a desired previous row and column location. However, various other types of calculations can be performed using the PRIOR function. For example, rather than calculating a moving sum, a weekly average of the sales receipts can be calculated by dividing the value of the moving sum for the final day by the size of the sliding window. Again this may be expressed as a conventional database statement, as previously illustrated.

Exemplary Technique for Implementing Cumulative Sums in Parallel Using the Prior Function During query evaluations, it is possible to underutilize a server 130 that is evaluating a query sequentially. According to one embodiment of the invention, in order to avoid potential bottlenecks in evaluating queries that utilize the prior function, a parallel algorithm may be used. First, computations that use the PRIOR function to generate a table are transformed into a computation of prefix sums. Second, an asymptotically optimal parallel operation is used to compute the prefix sums.

Consider an exemplary case of the PRIOR function wherein a cumulative sum is calculated. Next consider a table that has n rows. Referring to the first table 250 (see FIG. 2), the sales value in row i can be represented as a[i], and the PRIOR function for the $k^{th}$ row would be in the form of s[k]. The cumulative sum formulation using PRIOR can be transformed to prefix sums using a simple recursive formulation given by:

$$s[1]=a[1]$$

$$s[k]=s[k-1]+a[k], \text{ for } k=2,3,\ldots n$$

Rather than calculating the requested formulation in a sequential manner (i.e., s[1], s[2], . . . , s[n]), the PRIOR function is unrolled and the formula for each s[k] is explicitly worked out. This results in the following:

$$s[1]=a[1]$$

$$s[2]=a[1]+a[2]$$

$$s[n-1]=a[1]+a[2]+a[3]+\ldots a[n-1]$$

$$s[n]=a[1]+a[2]+a[3]+\ldots a[n-1]+a[n]$$

This is equivalent to computing the n prefix sums for the sales table based on the sales column. These equations can then be computed using various efficient parallel processing techniques, such as those employing standard techniques for recursive doubling. Various other parallel processing techniques may also be used. For example, according to one embodiment of the present invention, the parallel processing operation uses a divide and conquer technique that does not utilize recursive doubling. This technique works for both shared and distributed memory models. The technique will hereafter be referred to as ParallelPrefix. ParallelPrefix includes three essential steps and makes various assumptions. First, assume that the first table 250 has n rows and that there are p processors available to compute the prefix sums. Next, assume that the processors are ordered from 1–p such that the first processor is responsible for the first n/p rows, the second processor is responsible for the next n/p rows, etc. Step 1 of parallel prefix requires that each processor compute its local prefix sum. Each processor i sends the prefix sum of its last row to each processor i+1, . . . p. Hence, each processor i receives i−1 prefix sums that are sent to it. Next, each processor i adds up all the i−1 prefix sums that is has received, and adds the value of the prefix sum for each local row.

The complexity of parallel prefix in a shared or distributed memory model can be expressed as O(n/p+p). For reasonable values of n and p (n>>p), however this can be reduced to O(n/p). Since each processor has to examine at least each row that it owns, a lower bound on the problem of the prefix sums is O(n/p). Therefore, ParallelPrefix can be considered asymptotically optimal. Finally, the asymptotic complexity of ParallelPrefix is exactly the same as that for a parallel full scan of a table with n rows using p processors. In addition, transformation of the PRIOR function implementing cumulative sums into prefix computations as illustrated above, works for all SQL arithmetic operators since such operators are both cumulative and associative.

Exemplary System

Figure 4:
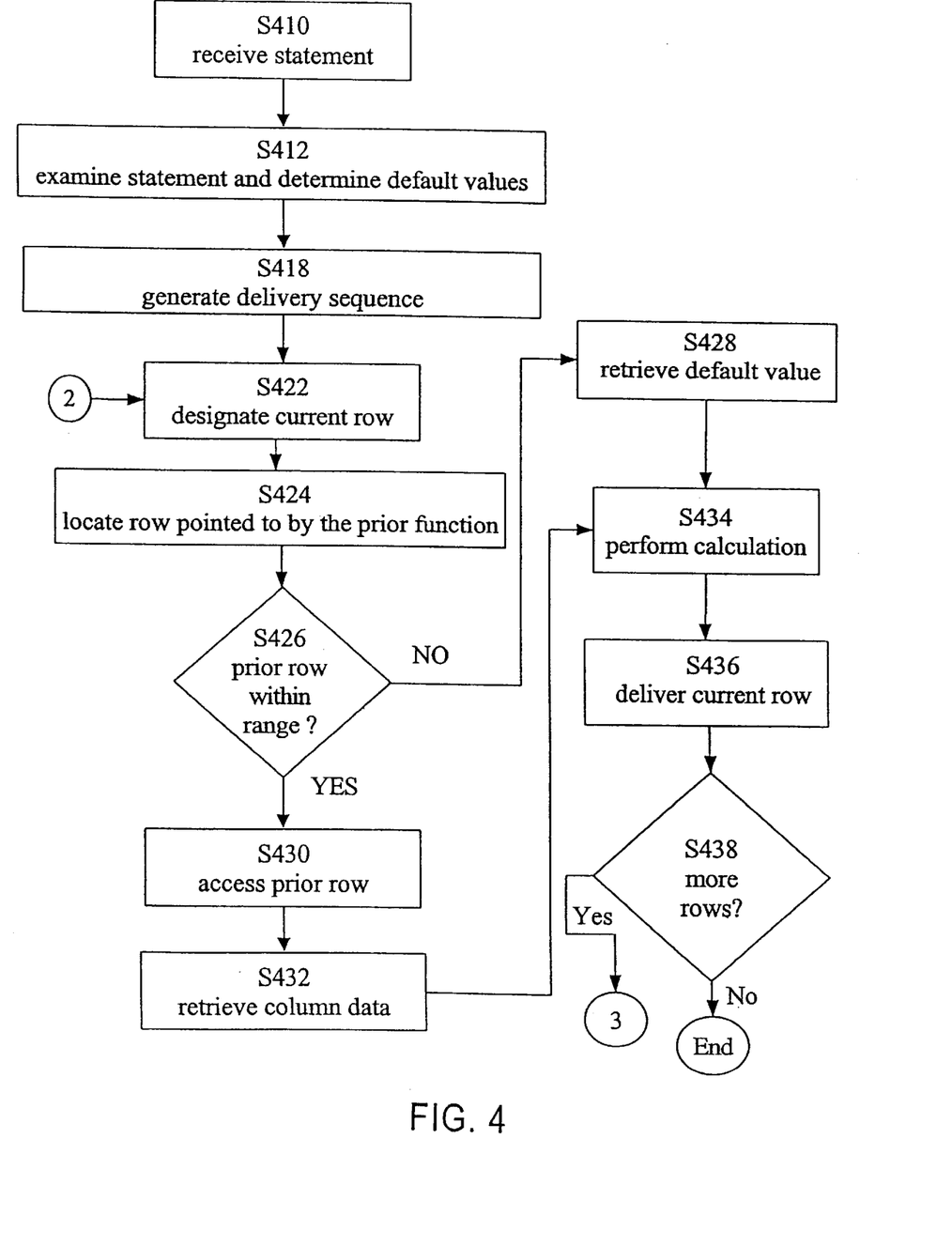
FIGS. 4 and 5 are a flowchart illustrating steps to access previous rows of data and manage a buffer according to an embodiment of the present invention.
Figure 5:
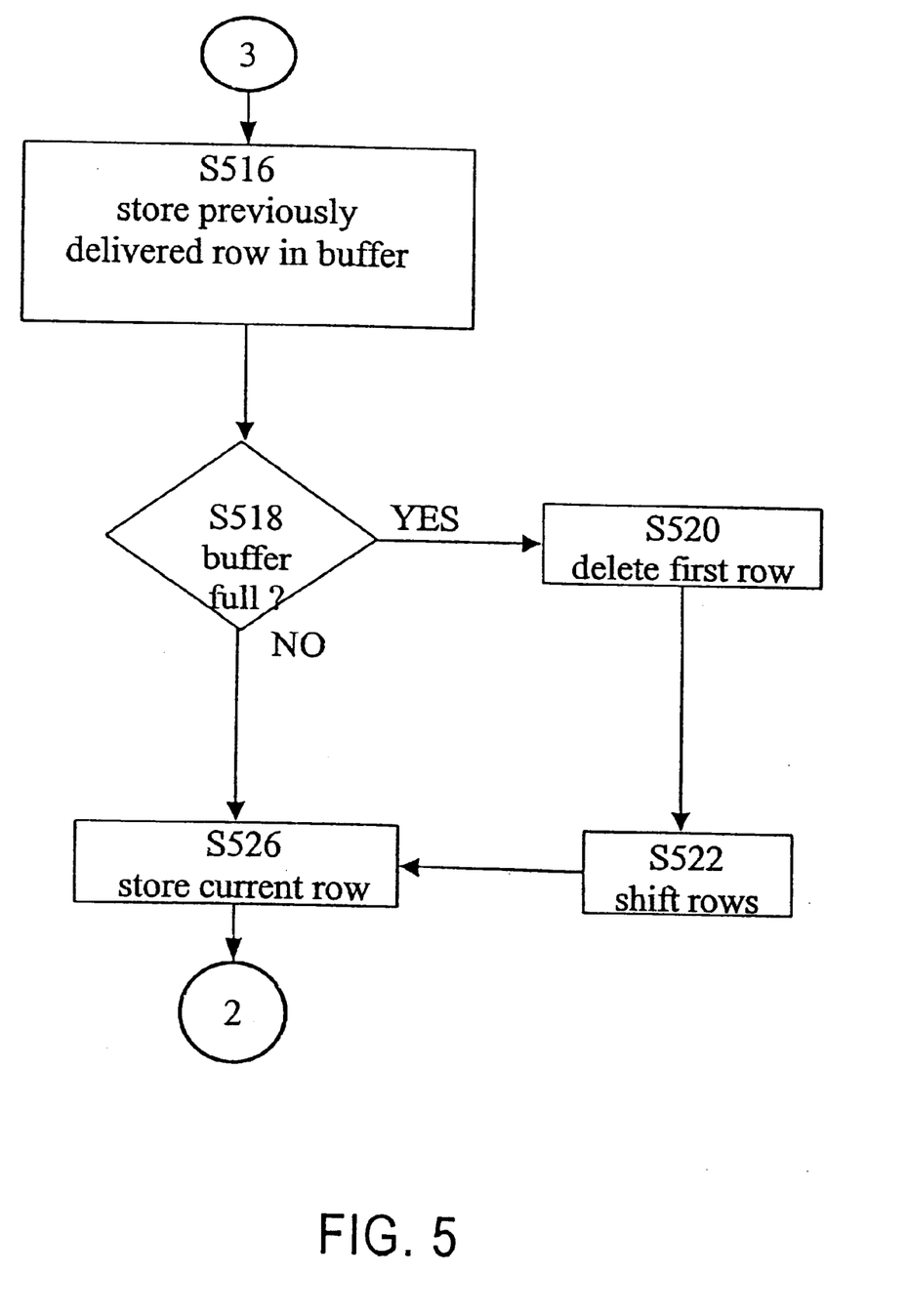

FIGS. 4 and 5 are a flowchart illustrating steps to access previous rows of data and manage a buffer according to an embodiment of the present invention. The server 130 communicates with a host 124 (i.e., the client station) by transmitting data over the local network 122. The data exchange may also take place over both the local network 122 and the internet 128 via an ISP 126.

At step S410, the server 130 receives from the client station 124 a statement that includes a reference to invoke the PRIOR function. At step S412, the server 130 examines it and determines the default values of parameters which have been omitted. At step S418, the server 130 generates a sequence of rows of data that will be delivered to the client station 124 and begins to transmit the rows of data. As each row is processed by the server, the server 130 continually designates a current row of data in the generation sequence.

In order to expedite access to the previous rows of data, a buffer may be provided within the dynamic memory portion of the server 130.

According to an embodiment of the present invention, the server 130 will be configured to create the buffer based on the value of the offset parameter. For example, if the offset parameter has a value of 5, the buffer may be configured to store, for example, at least 6 rows. Hence, the buffer will always hold the current row and the previous 5 rows relative to the current row.

As rows of data are transferred to the client station 124, the server 130 also stores a copy of the transferred rows within the buffer at step S516. After each row of data has been stored in the buffer, the server 130 checks to see if there is available storage space for the next row of data by checking to see if the buffer is full at step S518. If the buffer is full, then the first row of data that was stored in the buffer (i.e., the oldest row) is deleted at step S520. For example, if the buffer contains 20 rows of data, sequentially numbered 1–20, then row 1 would be deleted.

At step S522, the remaining rows of data stored in the buffer are shifted by one location. As illustrated by the flowchart in FIG. 5, the buffer is managed as a first in-first out (FIFO) buffer. Hence, when the rows are shifted at step S522 each row is shifted one location so that row 2 now becomes the first row of data stored in the buffer. Typically this "shifting" will be performed logically, rather than physically, by incrementing a buffer pointer that points the buffer location that should receive the current row and overwriting the contents of the buffer location.

At step S526 the current row of data is stored in the buffer. After storing the current row, control is transferred to control block 2.

Referring again to FIG. 4, the server 130 designates a current row at step S422. The row of data pointed to by the PRIOR function is located at step S424. The row of data, referred to herein as the "prior" row, is located based on the location of the current row and the offset parameter value supplied to the PRIOR function. For example, a value of "3" for the offset indicates to the server 130 that the row of data which must be accessed is three rows prior to the designated current row of data.

At step S426, the server 130 detects whether the prior row of data specified by the offset parameter is within a predetermined range of accessible rows of data within the generation sequence. If the prior row is within the predetermined range, then at step S430 the server 130 accesses the previous row, and at step S432 the server 130 retrieves column data from the prior row based on the column parameter. If the prior row is not within the predetermined range, then control passes to step S428 and the default value is returned by the function.

For example, if the current row is the third row in the generation sequence, the accessible rows of data include the first and second rows in the generation sequence. However, an offset parameter of 5 would require access to a row that precedes the third row by five rows. Since no row precedes the third row by five rows, control would pass from step S426 to step S428. At step S428, the server 130 returns the default value as the result of the function.

The value returned by the function is used to calculate values requested by the client station 124 as part of a query at step S434. Once the values have been calculated, they are inserted into specified columns of the current row and the current row is delivered to the client station at step S436. At step S438, the sever determines if there are additional rows in the generation sequence. If there are no additional rows, then the server 130 indicates to the client station 124 that all rows have been delivered and execution ends. If there are additional rows, then control transfers to control block 3, where the sequence is repeated until all rows have been delivered.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for providing access to a previous row of data comprising the steps:

receiving a statement that requires generation of one or more rows of data and contains a function call that returns a column value of a previously generated row of data;

while generating a current row of said one or more rows of data, accessing the previously generated row of said one or more rows of data to obtain the column value specified in the function call; and generating at least one value for said current row based on the column value obtained from the previously generated row.

2. The method of claim 1 wherein:

the step of receiving a statement that requires generation of one or more rows of data includes receiving said statement from a client that requires delivery of said one or more rows of data to said client from a server;

the step of accessing a previously generated row of said one or more rows of data includes accessing a buffered copy of a previously delivered row of said one or more rows of data; and after generating said at least one value for said current row, delivering said current row to said client.

3. The method of claim 1 wherein the function call further specifies a location, in the generation sequence, of the previously generated row relative to the current row.

4. The method of claim 3 wherein:

the received statement includes a default parameter that specifies a default column value for the previously generated row, relative to the current row, in the generation sequence; and the step of accessing the previously generated row further includes the steps:

determining the location of the previously generated row within the generation sequence based on the location specified in the function call, and if the location determined is outside a predetermined range of addressable rows in the generation sequence, then employing the default column value as the column value for the row specified by the location.

5. The method of claim 3 further comprising the steps:

creating a buffer in a dynamic memory of the server, said buffer having a size in rows based on the location specified in the function call; and storing a sequence of rows of data in said buffer, said rows including said current row and the previously generated row specified by the location.

6. The method of claim 5 further comprising the steps:

if the number of previously generated rows of data specified by the location requires less memory than the size of the buffer, then performing the steps:
creating a free row location within the buffer, and
storing the current row into the free row location of the buffer; and if the number of previously generated rows of data specified by the location requires more memory than the size of the buffer, then performing the steps:
deleting a first row of data stored in the buffer,
creating a free row location by shifting each subsequent row of data one location within the buffer, and storing the current row of data into the free row location of the buffer.

7. The method of claim 6 further comprising the step:
if the number of previously generated rows of data specified by the location requires more memory than the size of the buffer, then storing the current row of data into the oldest row location of the buffer, thereby erasing the previous contents of the oldest row location of the buffer.

8. The method of claim 5 further comprising a step of freeing up dynamic memory by performing the steps:
determining a selected number of previously generated rows of data in the generation sequence that will be accessed;
storing only the selected previously generated rows of data into the buffer; and
deallocating dynamic memory in the buffer which does not contain the selected previously generated rows of data.

9. The method of claim 5 further comprising the steps:
selecting at least one pair of useable previously generated rows of data from the predetermined number of previously delivered rows of data stored in the buffer;
identifying a plurality of non-useable previously generated rows of data located between each selected pair of useable previously generated rows of data;
selecting a pair of useable previously generated rows of data having a maximum distance therebetween; and
freeing up dynamic memory allocated to the buffer for storing non-useable previously generated rows of data.

10. The method of claim 9 wherein the step of selecting at least one pair of useable previously generated rows of data further includes the steps:
evaluating a distance between each pair of useable previously generated rows of data stored in the buffer; and
comparing the evaluated distances between all pairs of useable previously generated rows of data.

11. The method of claim 9 wherein the step of freeing up dynamic memory comprises the steps:
comparing the maximum distance to a predetermined distance; and
if the maximum distance exceeds the predetermined distance, then performing the steps:
creating a second buffer in the dynamic memory of the server,
segmenting data stored in the buffer into a first portion and a second portion, each of the portions storing a useable previously generated row from the pair of useable previously generated rows of data having the maximum distance therebetween, and none of the nonuseable previously generated rows of data,
storing the second portion of data into the second buffer,
indicating the location in dynamic memory where the second buffer is located, and
deallocating dynamic memory in the buffer that was previously allocated to the second portion of data and the non-useable previously generated rows of data.

12. The method of claim 1 wherein the step of generating at least one value further includes the steps of:
transforming the received statement into one or more prefix sums; and
evaluating the one or more prefix sums.

13. The method of claim 12 wherein the step of evaluating the one or more prefix sums includes the step of applying an asymptotically optimal parallel operation to evaluate the one or more prefix sums.

14. A computer-readable medium carrying one or more sequences of instructions for providing access to one or more previously generated rows of data, wherein execution of the one or more sequences of instructions by one or more processors causes the one or more processors to perform the steps of:
receiving a statement that requires delivery of one or more rows of data and contains a function call that returns a column value of a previously generated row of data;
while generating a current row of said one or more rows of data, accessing the previously generated row of said one or more rows of data to obtain the column value specified in the function call; and
generating at least one value for said current row based on the column value obtained from the previously generated row.

15. The computer-readable medium of claim 14 wherein:
the function call further specifies a location in the generation sequence of the previously generated row relative the current row; and
execution of the one or more sequences of instructions by one or more processors further causes the one or more processors to perform the steps of:
creating a buffer in a dynamic memory of the server, said buffer having a size in rows based on the location specified in the function call; and
storing a sequence of rows of data in said buffer, said rows including said current row and the previously generated row specified by the location.

16. The computer-readable medium of claim 15 wherein the one or more processors further perform the steps:
if the number of previously generated rows of data specified by the location requires less memory than the size of the buffer, then performing the steps:
creating a free row location within the buffer, and
storing the current row into the free row location of the buffer; and
if the number of previously generated rows of data specified by the location requires more memory than the size of the buffer, then performing the steps:
deleting a first row of data stored in the buffer,
creating a free row location by shifting each subsequent row of data one location within the buffer, and
storing the current row of data into the free row location of the buffer.

17. The computer-readable medium of claim 15 wherein the one or more processors further perform the step:
if the number of previously generated rows of data specified by the location requires more memory than the size of the buffer, then storing the current row of data into the oldest row location of the buffer, thereby erasing the previous contents of the oldest row location of the buffer.

18. The computer-readable medium of claim 14 where in the one or more processor free up dynamic memory by performing the steps:
determining a selected number of previously generated rows of data in the generation sequence that will be accessed;
storing only the selected previously generated rows of data into the buffer; and
deallocating dynamic memory in the buffer which does not contain the selected previously generated rows of data.

19. The computer-readable medium of claim 14 further comprising the steps:

selecting at least one pair of useable previously generated rows of data from the predetermined number of previously generated rows of data stored in the buffer;

identifying a plurality of non-useable previously generated rows of data located between each selected pair of useable previously generated rows of data;

selecting a pair of useable previously generated rows of data having a maximum distance therebetween; and freeing up dynamic memory allocated to the buffer for storing non-useable previously generated rows of data.

20. The computer-readable medium of claim 19 wherein the step of selecting at least one pair of useable previously generated rows of data further includes the steps:

evaluating a distance between each pair of useable previously generated rows of data stored in the buffer; and comparing the evaluated distances between all pairs of useable previously generated rows of data.

21. The computer-readable medium of claim 19 wherein the step of freeing up dynamic memory comprises the steps:

comparing the maximum distance to a predetermined distance; and if the maximum distance exceeds the predetermined distance, then performing the steps:

creating a second buffer in the dynamic memory of the server, segmenting data stored in the buffer into a first portion and a second portion, each of the portions storing a useable previously generated row from the pair of useable previously generated rows of data having the maximum distance therebetween, and none of the non-useable previously generated rows of data, storing the second portion of data into the second buffer, indicating the location in dynamic memory where the second buffer is located, and deallocating dynamic memory in the buffer that was previously allocated to the second portion of data and the non-useable previously generated rows of data.

22. A system for providing access to one or more previously generated rows of data, the system comprising:

a server configured to:

receive a statement that requires delivery of one or more rows of data, said statement specifying the location of the one or more previously generated rows of data, relative to the current row, in a generation sequence, create a buffer in dynamic memory, said buffer having a size in rows based on the location specified in the statement, while generating a current row of said one or more rows of data, accessing a previously generated row of said one or more rows of data specified by the location;

store a sequence of rows of data in said buffer, said rows including said current row and the previously generated row; and generate at least one value for said current row based on the data from the previously generated row.

23. The system of claim 22 further comprising a client configured to transmit said statement to said server.

24. The system of claim 22 wherein:

said statement further includes a default parameter that specifies a default column value for the previously generated row, relative to the current row, in the generation sequence; and said server is further configured to access the one or more previous rows of data by performing the steps:

determining the location of the one or more previously generated rows of data within the within the generation sequence based on the location specified in the function call, and if the location determined is outside a predetermined range of addressable rows in the generation sequence, then employing the default column value for the row specified by the location.

25. The system of claim 22 wherein said server is further configured to:

determine the amount of memory required to store the one or more previously generated rows of data specified by the location;

if the number of previously generated rows of data specified by the location requires less memory than the size of the buffer, then performing the steps:

creating a free row location within the buffer, and storing the current row into the free row location of the buffer; and if the number of previously generated rows of data specified by the location requires more memory than the size of the buffer, then storing the current row of data into the oldest row location of the buffer, thereby erasing the previous contents of the oldest row location of the buffer.

26. The system of claim 22, wherein said database server is further configured to:

determine a selected number of previously generated rows of data in the generation sequence that will be accessed;

store only the selected previously generated rows of data into the buffer; and deallocate dynamic memory in the buffer which does not contain the selected previously generated rows of data.

27. The system of claim 22, wherein said server is further configured to:

select at least one pair of useable previously generated rows of data from the predetermined number of previously delivered previously generated rows of data stored in the buffer;

identify a plurality of non-useable previously generated rows of data located between each selected pair of useable previously generated rows of data;

evaluate a distance between each pair of useable previously generated rows of data stored in the buffer;

compare the evaluated distances between all pairs of useable previously generated rows of data;

select a pair of useable previously generated rows of data having a maximum distance therebetween;

if the maximum distance exceeds the predetermined distance, then performing the steps:

creating a second buffer in dynamic memory, segmenting data stored in the buffer into a first portion and a second portion, each of the portions storing a useable previously generated row from the pair of useable previously generated rows of data having the maximum distance therebetween and none of the non-useable previously generated rows of data, storing the second portion of data into the second buffer, indicating the location in dynamic memory where the second buffer is located, and deallocating dynamic memory in the buffer that was previously allocated to the second portion of data and the non-useable previously generated rows of data.

* * * * *